United States Patent
Kaminsky et al.

(10) Patent No.: US 7,496,352 B2
(45) Date of Patent: Feb. 24, 2009

(54) ENVIRONMENTALLY DRIVEN PHONE BEHAVIOR

(75) Inventors: David L. Kaminsky, Chapel Hill, NC (US); David M. Ogle, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 256 days.

(21) Appl. No.: 10/790,968

(22) Filed: Mar. 2, 2004

(65) Prior Publication Data

US 2005/0197138 A1 Sep. 8, 2005

(51) Int. Cl.
*H04M 7/22* (2006.01)
(52) U.S. Cl. ............... 455/412.2; 455/412.1; 455/456.1
(58) Field of Classification Search .............. 455/456.1, 455/412.1, 412.2, 445
See application file for complete search history.

(56) References Cited

U.S. PATENT DOCUMENTS

| | | | | |
|---|---|---|---|---|
| 4,076,968 | A | 2/1978 | Wattenbarger | 179/84 |
| 5,479,476 | A | 12/1995 | Finke-Anlauff | 379/58 |
| 5,649,007 | A | 7/1997 | Yamada | 379/373 |
| 5,844,983 | A | 12/1998 | Lilja | 379/418 |
| 6,044,279 | A | 3/2000 | Hokao et al. | 455/567 |
| 6,047,195 | A | 4/2000 | Nakanishi | 455/552 |
| 6,246,761 | B1 | 6/2001 | Cuddy | 379/418 |
| 6,285,891 | B1 * | 9/2001 | Hoshino | 455/567 |
| 6,311,078 | B1 | 10/2001 | Hardouin | 455/567 |
| 6,351,639 | B1 | 2/2002 | Motohashi | 455/420 |
| 6,418,330 | B1 | 7/2002 | Lee | 455/567 |
| 6,424,251 | B1 | 7/2002 | Byrne | 340/311.1 |
| 6,463,278 | B2 | 10/2002 | Kraft et al. | 455/418 |
| 6,560,466 | B1 | 5/2003 | Skorko | 455/567 |
| 6,574,471 | B1 | 6/2003 | Rydbeck | 455/418 |
| 7,024,229 | B2 * | 4/2006 | Nishimura | 455/567 |
| 7,142,664 | B2 * | 11/2006 | Seligmann | 379/373.01 |
| 2001/0006546 | A1 | 7/2001 | Jung | 379/56.3 |
| 2001/0014616 | A1 | 8/2001 | Matsuda et al. | 455/567 |
| 2001/0049275 | A1 | 12/2001 | Pierry et al. | 455/414 |
| 2002/0010008 | A1 | 1/2002 | Bork et al. | 455/567 |
| 2002/0052225 | A1 | 5/2002 | Davis et al. | 455/567 |
| 2002/0068587 | A1 | 6/2002 | Chapman | 455/461 |
| 2002/0119788 | A1 | 8/2002 | Parupudi et al. | 455/456 |
| 2002/0142792 | A1 | 10/2002 | Martinez | 455/550 |
| 2002/0193150 | A1 | 12/2002 | Pritchard | 455/567 |
| 2003/0003965 | A1 | 1/2003 | Gough | 455/567 |
| 2003/0008644 | A1 | 1/2003 | Akhterzzaman et al. | 455/418 |
| 2003/0013495 | A1 | 1/2003 | Oleksy | 455/567 |

(Continued)

*Primary Examiner*—George Eng
*Assistant Examiner*—Muthuswamy G Manoharan
(74) *Attorney, Agent, or Firm*—Duke W. Yee; Bruce Clay; Rudolf O. Siegesmund

(57) ABSTRACT

A method for controlling the behavior of a telephone using policies, the method comprising a Policy Creation Program (PCP) and a Behavior Control Program (BCP). The policies comprise telephone behavior instructions and three criteria conditions: location criteria, context criteria, and caller criteria. Each policy is also assigned a policy priority number based on the importance of the policy, which is used to resolve conflicts between the policies. The PCP allows the user to create the policies and stores the policies in a policy table based on the policy priority numbers. The BCP detects an incoming telephone call and determines the location, context, and caller conditions. The BCP compares the location, context, and caller conditions to a plurality of the policies and determines the policy that matches the conditions. The BCP then controls the telephone's behavior according to the telephone behavior instructions in the policy.

2 Claims, 3 Drawing Sheets

U.S. PATENT DOCUMENTS

| | | |
|---|---|---|
| 2003/0017859 A1 | 1/2003 | Martinez et al. ............ 455/567 |
| 2003/0032457 A1 | 2/2003 | Leung ........................ 455/567 |
| 2003/0033214 A1 | 2/2003 | Mikkelson et al. ............ 705/26 |
| 2003/0054866 A1 | 3/2003 | Byers et al. ................. 455/567 |
| 2003/0063072 A1 | 4/2003 | Brandenberg et al. ....... 345/173 |
| 2003/0133551 A1 | 7/2003 | Kahn .................... 379/102.03 |
| 2003/0134626 A1 | 7/2003 | Himmel et al. ............. 455/419 |
| 2003/0216134 A1 | 11/2003 | Mutoh ..................... 455/404.1 |
| 2003/0224772 A1 | 12/2003 | Patzer et al. ................ 455/419 |
| 2004/0142703 A1* | 7/2004 | Erb et al. .................. 455/456.1 |
| 2005/0221808 A1* | 10/2005 | Karlsson et al. ............. 455/418 |
| 2006/0094404 A1* | 5/2006 | Burgess ................... 455/412.1 |

* cited by examiner

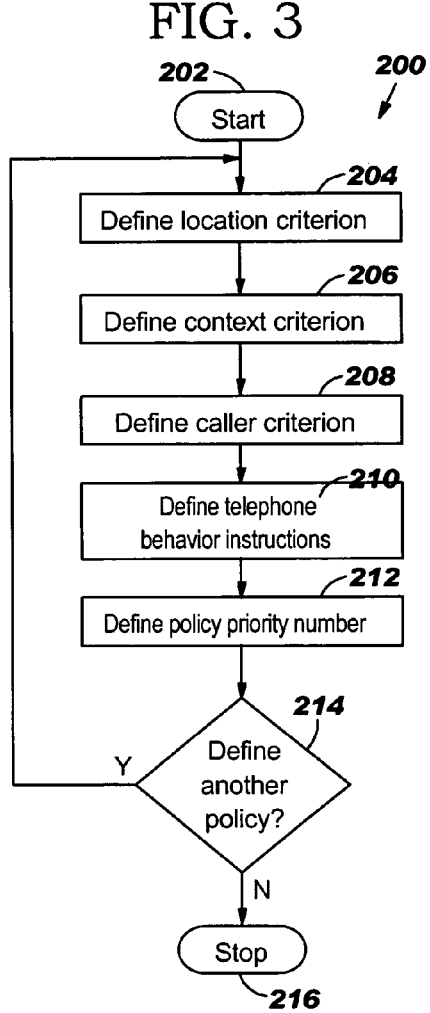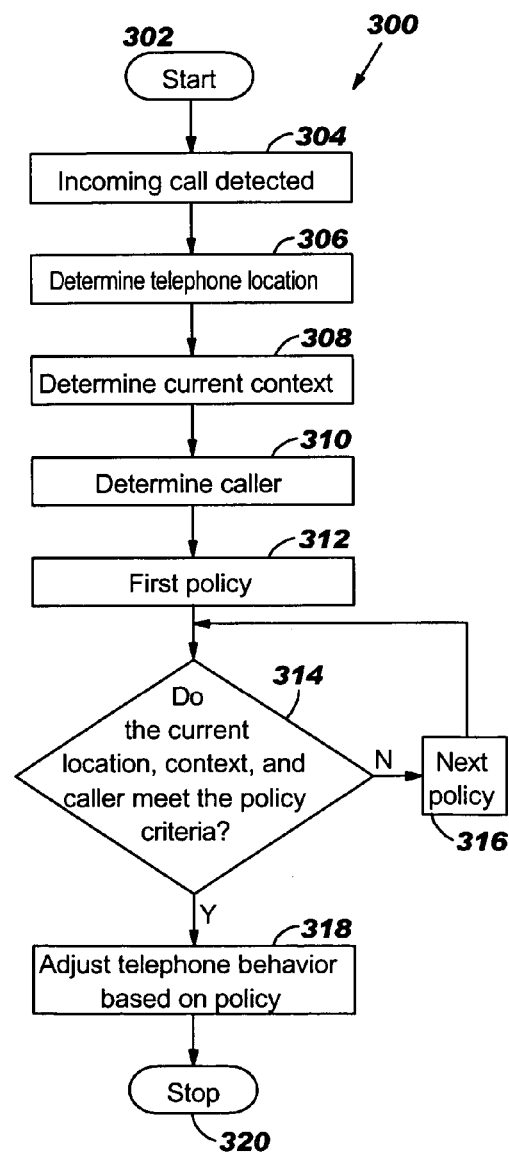

FIG. 4

| Policy Priority Number | Location Criteria | Context Criteria | Caller Criteria | Telephone Behavior Instructions |
|---|---|---|---|---|
| 1 | Any | Any | Wife and wife has called within the previous two minutes | Vibrate, play message, ring after thirty seconds |
| 2 | Any | Not presentation | Call from wife or home | Ring tow levels higher |
| 3 | Any | Presentation | Any | Send calls to voicemail |
| 4 | Any | Meeting | Any | Vibrate |
| 5 | Outside | Any | Any | Ring at level 3 |
| 6 | Move theater | Any | Any | Ring using beeping tone |
| 7 | Airplane | Any | Any | Turn off telephone |
| 8 | Any | Any | Any | Ring at normal level |

ENVIRONMENTALLY DRIVEN PHONE BEHAVIOR

FIELD OF THE INVENTION

The present invention relates generally to methods for modifying a cellular telephone's behavior and specifically to a method for creating a collection of policies that define the telephone's behavior based on a plurality of conditions.

BACKGROUND OF THE INVENTION

Many people carry cellular telephones because of the convenience cellular telephones provide. Unfortunately, there are instances when a ringing cellular telephone disturbs people around the cellular telephone user. For example, a ringing cellular telephone can be disturbing in a meeting, presentation, library, theater, or any other quiet environment. In order to avoid creating a disturbance, cellular telephones are equipped with features that allow the user to change the telephone behavior by changing the ring volume, the ring type, or setting the ringer to a vibrate mode. However, these features are only activated when the user manually changes a setting on the cellular telephone. Because the user must manually change the setting, a cellular telephone equipped with these features will create a disturbance if the user forgets to make the change. Therefore, a need exists for a method for automatically changing the telephone behavior so that the cellular telephone will not create a disturbance when the user forgets to manually change one or more settings on a cellular telephone.

The prior art has previously addressed the problem of automatically changing the telephone behavior. For example, United States Patent Application Publication 2003/0134626 (the '626 application) entitled "Apparatus and Method for Managing Mobile Phone Answering Mode and Outgoing Message Based on a Location of the Mobile Phone" discloses a method for changing the telephone behavior based on the location of the cellular telephone. The '626 application invention determines the location of the cellular telephone and restricts the cellular telephone's operation based on the location. United States Patent Application Publication 2001/0049275 (the '275 application) entitled "Automated Alert State Change of User Devices for Time-Based and Location-Based Events" discloses a method for changing the telephone behavior based on the current event. The '275 application invention looks up the current event in the user's calendar and determines whether to modify the cellular telephone's behavior based on the current event. In yet another example, United States Patent Application Publication 2001/0014616 (the '616 application) entitled "Portable Mobile Unit" discloses a method for changing the behavior of a telephone based on the telephone number associated with the party placing the incoming call. The '616 application invention determines the telephone number associated with an incoming call and modifies the behavior based on the telephone number. Thus, based on the disclosures of the '626, '275, and '616 applications, the current art allows the user to automatically change the telephone behavior based on one of a plurality of conditions, such as the location of the telephone, the user's calendared events, and telephone number associated with the incoming call.

In many circumstances, changing the telephone behavior based on a single condition is insufficient control over the behavior to the cellular telephone. For example, if the user is in a movie theatre, it is acceptable to let the cellular telephone ring before the movie, but not during the movie. Similarly, if the user is on a golf course, it is acceptable to let the cellular telephone ring while the user is in the parking lot or clubhouse, but it is not acceptable to let the cellular telephone ring while the user is on the tee boxes, fairways, or greens. In another example, a user may not want a cellular telephone to ring while the user is in a meeting unless the call is from an important client. In addition, a user may not want the cellular telephone to ring if the incoming call is from the user's wife, but the user might want the cellular telephone to ring if the user's wife called a plurality of times within a short time period. The user might want the cellular telephone to ring in that case because a plurality of telephone calls within a short amount of time usually indicates an emergency. While the prior art discloses changing the telephone behavior based on a single condition, the prior art does not disclose a method for modifying the telephone behavior based upon a plurality of different conditions. Consequently, a need exists in the art for a method for modifying the telephone behavior based upon a plurality of conditions, such as the location of the telephone, the user's calendared events, and telephone number associated with the incoming call.

Modifying the telephone behavior based upon a plurality of conditions creates a need for conflict resolution when the telephone behavior outcomes conflict. For example, the condition criteria "if A then B; but if not A, then C" defines two outcomes: B and C. Similarly, the condition criteria "if D then B; but if not D, then C" also defines two outcomes: B and C. When the two condition criteria are combined, it is possible for the determination of the outcome to be uncertain because the outcomes conflict with each other. In the preceding example, no conflict arises when both A and D are true or when both A and D are false. However, a conflict arises when either A or D is true and the other is false. When the outcomes conflict with one another, it is necessary to create a method for resolving the conflict. Consequently, a need exists in the art for a method for resolving the outcome conflicts that arise when modifying the telephone behavior based upon a plurality of conditions.

SUMMARY OF THE INVENTION

The present invention, which meets the needs identified above, is a method for controlling the behavior of a telephone using policies. The policies comprise telephone behavior instructions and three criteria conditions: location criteria, context criteria, and caller criteria. The telephone behavior instructions control the telephone behavior if the incoming telephone call meets the criteria conditions. The location criterion is the location of the telephone. The context criterion is the events that the user is currently participating in. The caller criterion is the identity of the person placing the incoming telephone call. Each policy is also assigned a policy priority number based on the importance of the policy. The policy priority numbers are used to resolve conflicts between the policies.

The software embodiment of the present invention comprises a Policy Creation Program (PCP) and a Behavior Control Program (BCP). The PCP allows the user to create policies for the telephone. The PCP stores the policies in a policy table based on the policy priority numbers. The BCP detects an incoming telephone call and determines the current location of the telephone, the current event that the user is participating in, and the caller's identity. The BCP compares the location, context, and caller conditions to a plurality of the policies and determines the policy that matches the conditions. The BCP then controls the telephone's behavior according to the telephone behavior instructions in the policy.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is an illustration of the Policy Creation Program (PCP) of the present invention;

FIG. 4 is an illustration of the policy table of the present invention; and

FIG. 5 is an illustration of the Behavior Control Program (BCP) of the present invention.

DETAILED DESCRIPTION OF THE PREFERRED EMBODIMENT

As used herein, the term "absolute ring volume" shall mean the volume of a cellular telephone ringer based on a fixed volume scale.

As used herein, the term "caller criterion" shall mean the condition criterion related to a telephone number associated with a person or organization placing an incoming telephone call.

As used herein, the term "condition" shall mean one of a plurality of possibilities within a condition criterion. If condition criterion were the context criterion, then the conditions might be "presentation," "meeting," and "outside."

As used herein, the term "condition criterion" shall mean a defined set of possibilities and outcomes upon which an outcome is based.

As used herein, the term "context criterion" shall mean the condition criterion related to the event that a user is currently participating or involved in.

As used herein, the term "incoming call" shall mean a telephone call received by a telephone.

As used herein, the term "location criterion" shall mean the condition criterion related to the physical location of a telephone.

As used herein, the term "policy" shall mean a data construct comprising a plurality of condition criterion, a telephone behavior instruction, and a policy priority number.

As used herein, the term "telephone behavior" shall mean the action that a telephone takes in response to the reception of an incoming telephone call.

As used herein, the term "telephone behavior instruction" shall mean a set of instructions that define the telephone behavior when an incoming telephone call is received.

As used herein, the term "relative ring volume" shall mean the volume of a cellular telephone ringer relative to a currently selected ringer volume.

As used herein, the term "ring tone" shall mean the tone, song, or melody played when a telephone receives an incoming telephone call.

Figure 1:
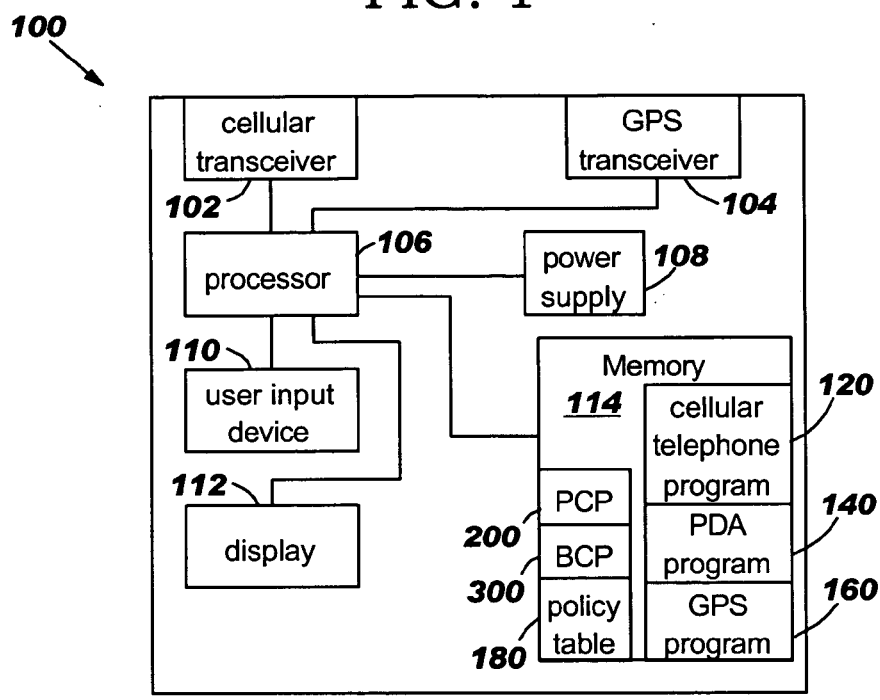
FIG. 1 is an illustration of the telephone of the present invention.

FIG. 1 is an illustration of telephone 100 of the present invention. Telephone 100 is a portable wireless device capable of communication with a plurality of wireless communications networks (not shown). For example, telephone 100 communicates with a cellular telephone network (not shown) via cellular transceiver 102. Telephone 100 also communicates with the Global Positioning Satellite (GPS) network (not shown) via GPS transceiver 104. Persons of ordinary skill in the art are aware of other wireless communication networks that telephone 100 can be configured to communicate with.

Cellular transceiver 102 and GPS transceiver 104 are electrically connected to processor 106. Processor 106 executes instructions stored in files and programs in memory 114. Memory 114 contains a plurality of different files and programs including, but not limited to, cellular telephone program 120, Personal Digital Assistant (PDA) program 140, and GPS program 160. Cellular telephone program 120 informs processor 106 how to configure cellular transceiver 102 to communicate with the cellular telephone network (not shown). PDA program 140 is a calendaring and contact database and program. PDA program 140 stores the events that the user attends. PDA program 140 also stores the telephone numbers for a plurality of people that the user associates with. GPS program 160 informs processor 106 how to configure GPS transceiver 104 to communicate with the GPS network (not shown). As part of the present invention, memory 114 is also configured with Policy Creation Program (PCP) 200, Behavior Control Program (BCP) 300, and policy table 180. Persons of ordinary skill in the art are aware of other programs and files that may be stored in memory 114.

GPS program 160 includes a plurality of maps detailing the areas that the user visits. Such maps are currently available in the art as evidenced by the GPS navigation systems installed in many golf carts, aircraft, and automobiles. As part of the present invention, the maps of GPS program 160 include the interior features of buildings, such as the various floors of a building and the walls separating the rooms on each floor. Thus, the GPS network can determine the particular floor and room that the telephone is in when the telephone is in a building. These maps would be useful in defining conference rooms, movie theatres, and clubhouses from the surrounding offices, other rooms, and common areas. The maps of GPS program 160 would need to be updated periodically as the buildings are modified. The updating process can be conducted by downloading new maps over the cellular telephone network or by installing a new memory card or storage disc in the telephone.

Processor 106 is also electrically connected to other components of telephone 100 such as power supply 108, user input device 110, and display 112. Power supply 108 provides power for the various components of telephone 100. User input device 110 is a means for a user to enter data into telephone 100. User input device 110 may be a keypad, a stylus, a mouse, a touch screen, or any other user input device known to person of ordinary skill in the art. Display 112 is a means for displaying data contained within telephone 100. Processor 106 can also be electrically connected to other components of telephone 100 such as a microphone (not shown) and an audio emitting device, such as a speaker (not shown). Persons of ordinary skill in the art are aware of other components that telephone 100 may contain.

Figure 2:
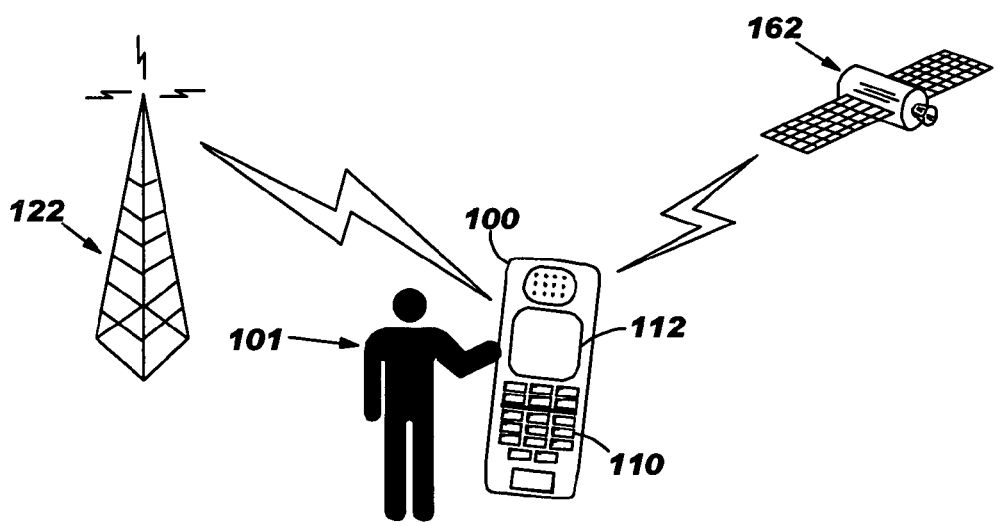
FIG. 2 is an illustration of the communication paths of the present invention.

FIG. 2 is an illustration of the communication paths of the present invention. User 101 enters data into telephone 100 via user input device 110. User 101 can obtain data from telephone 100 via display screen 112. User 101 may also communicate with telephone 100 via a microphone (not shown) and/or an audio emitting device, such as a speaker (not shown). Persons of ordinary skill in the art are aware of other methods for a user to communicate with telephone 100. Telephone 100 communicates with a plurality of wireless communications networks. For example, telephone 100 communicates with cellular telephone network 122 via a wireless means. Telephone 100 also communicates with GPS network 162 via a wireless means. The location of telephone 100, including whether telephone 100 is on the surface or in an airplane, can be determined using the GPS network. If desired, telephone 100 can be configured with a communications port such that telephone 100 communicates with a wired communications network (not shown). Persons of ordinary skill in the art are aware of how to configure telephone 100 for wireless or wired communications with a plurality of communications networks such as those depicted in FIG. 2.

FIG. 3 is an illustration of Policy Creation Program (PCP) 200 of the present invention. PCP 200 is a program that allows a user to define a plurality of policies that control the behavior of the telephone. PCP 200 starts (202) when the user indicates a desire to create a new policy. PCP 200 allows the user to define a plurality of condition criteria, the telephone behavior, and the policy priority number for each policy. In defining the policy conditions, telephone behavior, and policy priority number, the user is presented with a plurality of options and chooses one or several of the options at each step. Persons of ordinary skill in the art will appreciate that the PCP 200 can be configured with a plurality of menus such as drop down menus, radio buttons, or checkboxes to enable a user to select the various options from the menus.

PCP 200 then allows the user to define the location criterion for the policy (204). The location criterion is the policy condition relating to the location of the telephone when an incoming telephone call is received. The telephone may be like telephone 100 depicted in FIGS. 1 and 2. For example, if a user wants to create a policy that controls the behavior of the telephone when the telephone is in an airplane, then the user defines the location criterion as "airplane." If a user wants to create a policy that controls the behavior of the telephone when the user is in a movie theatre, then the user defines the location criterion as "movie theatre." If a user wants to create a policy that controls the behavior of the telephone when the user is outside, then the user defines the location criterion as "outside." If a user wants to create a policy that controls the behavior of the telephone regardless of the location, then the user defines the location criterion as "any." Persons of ordinary skill in the art are aware of methods for determining the location of the telephone, including whether the telephone is in an airplane, using the GPS communications network. Persons of ordinary skill in the art are aware that the GPS communications network has very accurate data regarding certain areas such as golf courses and urban areas. Thus, the GPS communications network can determine if a user is in a parking lot, on the golf course, airports, or inside a building, such as a clubhouse. Persons of ordinary skill in the art will appreciate that a user can create location criterion other than the location criterion depicted herein. Persons of ordinary skill in the art will also appreciate that a plurality of location criterion can be combined to produce more complex location criterion, such as "in a movie theatre or in an airplane" or "on the tee boxes, fairways, or greens of a golf course."

PCP 200 then allows the user to define the context criterion for the policy (206). The context criterion is the policy conditions relating to the event or activity that the user is engaged in when an incoming telephone call is received. The telephone can determine the event or activity that a user is engaged in when an incoming telephone call is received by accessing a PDA program and determining the event or activity in the user's calendar at the specific time that an incoming telephone call is received. The PDA program may be like PDA program 140 depicted in FIG. 1. As an example of a context criterion, if the user wants to create a policy that controls the behavior of the telephone when the user is in a meeting, then the user defines the context criterion as "meeting." If the user wants to be more specific and create a policy that controls the behavior of the telephone when the user is in a meeting with a member of his management chain, then the user defines the context criterion as "meeting with management." If the user wants to create a policy that controls the behavior of the telephone when the user is giving a presentation, then the user defines the context criterion as "presentation." If a user wants to create a policy that controls the behavior of the telephone regardless of the context, then the user defines the context criterion as "any." Persons of ordinary skill in the art will appreciate that a user can create context criterion other than the context criterion depicted herein. Persons of ordinary skill in the art will also appreciate that a plurality of context criterion can be combined to produce more complex context criterion, such as "meeting or presentation."

PCP 200 then allows the user to define the caller criterion for the policy (208). The caller criterion is the policy condition relating to the person who is placing the incoming telephone call. The telephone can determine the identity of the caller by accessing the caller ID information from the incoming telephone call and/or by accessing the PDA program and determining the person associated with a specific telephone number. As an example of the caller criterion, if the user wants to create a policy that controls the behavior of the telephone when the caller is the user's wife, then the user defines the caller criterion as "wife." The user can define more specific caller criterion such as "wife and wife has called within the previous two minutes." Caller criterion such as this would be met if the wife calls repeatedly (i.e. in an emergency), but not in a normal situation. If the user wants to block calls from a specific person, Fred, then the user defines the caller criterion as "Fred" and instructs the telephone behavior instructions to block the call. If the user does not want to screen the calls based on the caller, then the user defines the caller criterion as "all calls." Persons of ordinary skill in the art will appreciate that a user can create caller criterion other than the caller criterion depicted herein. Persons of ordinary skill in the art will also appreciate that a plurality of caller criterion can be combined to produce a more complex caller criterion, such as "calls from wife and wife has called within the previous two minutes."

PCP 200 then allows the user to define the telephone behavior instructions for the policy (210). The telephone behavior instructions define how the telephone will respond if the incoming telephone call matches the policy conditions. Telephone behavior instructions options include changing the absolute ring volume, changing the relative ring volume, changing the ring tone, playing a message to the caller, sending the call to voicemail, turning off the telephone, vibrating the telephone, or allowing the telephone to ring after a delay. If the user wants to set the telephone behavior instructions such that the telephone changes the absolute ringer volume when the incoming call meets the policy conditions, then the user defines the telephone behavior instructions as "ring at volume level 3." If the user wants to set the telephone behavior instructions such that the telephone changes the relative ringer volume when the incoming call meets the policy conditions, then the user defines the telephone behavior instructions as "ring at two levels higher." If the user wants to set the telephone behavior instructions such that the telephone changes the ring tone when the incoming call meets the policy conditions, then the user defines the telephone behavior instructions as "ring using beeping tone." If the user wants to set the telephone behavior instructions such that the telephone plays a message for the caller when the incoming call meets the policy conditions, then the user defines the telephone behavior instructions as "play message for caller." If the user wants to set the telephone behavior instructions such that the telephone turns off when the incoming call meets the policy conditions, then the user defines the telephone behavior instructions as "turn off telephone." If the user wants to set the telephone behavior instructions such that the telephone rings after a delay when the incoming call meets the policy conditions, then the user defines the telephone behavior instructions as "ring after a thirty second delay." A ring behavior such as this vibrates the telephone or displays a message for the user and allows the user to leave a room before the telephone starts to ring. The delayed ring allows the user to exit a meeting or presentation without disturbing the other participants. If the user wants to set the telephone behavior instructions such that the telephone rings normally when the incoming call meets the policy conditions, then the user defines the telephone behavior instructions as "ring normally." Persons of ordinary skill in the art will appreciate that a user can create telephone behavior instructions other than the telephone behavior instructions depicted herein. Persons of ordinary skill in the art will also appreciate that a plurality of telephone behavior instructions can be combined to produce a more complex telephone behavior instructions, such as "vibrate, play message for caller, and ring after a thirty second delay."

PCP 200 then allows the user to define the policy priority (212). The policy priority determines the order in which Behavior Control Program (BCP) 300 analyzes the policies. The policies with higher priority number are analyzed before the policies with lower priority numbers. The use of priority numbers avoids conflicts between the policy outcomes. Persons of ordinary skill in the art are aware of other methods for indicating the priority of the policies. After the user has defined the policy priority number, PCP 200 determines if the user wants to define another policy (214). If the user wants to define another policy, then PCP 200 returns to step 204. If the user does not want to define another policy, then PCP 200 ends (216).

FIG. 4 is an illustration of policy table 180 of the present invention. Policy table 180 is a table containing all of the policies arranged by their policy priority numbers 182. Policy table 180 comprises policy priority numbers 182, location criteria 184, context criteria 186, caller criteria 188, and telephone behavior instructions 190. Policy priority number 182 is the priority number assigned to the policies. Location criteria 184 are the location conditions for the telephone. Context criteria 186 are the context conditions for the telephone. Caller criteria 188 are the caller conditions for the telephone. Telephone behavior instructions 190 is the description of the telephone behavior instructions if all of the condition criteria for the particular policy are met.

FIG. 5 is an illustration of the Behavior Control Program (BCP) 300 of the present invention. BCP 300 analyzes an incoming telephone call and determines which policy controls the behavior of the telephone. BCP 300 starts (302) when the user indicates a desire to control the behavior of the telephone. BCP 300 then waits for an incoming telephone call (304). BCP 300 then determines the telephone location (306). The telephone location can be determined using GPS transceiver 104 depicted in FIG. 1. BCP 300 then determines the current context (308). The current context can be determined by analyzing the user's calendar in PDA program 140 depicted in FIG. 1. In other words, BCP 300 looks at the user's calendar and determines the type of event that the user has scheduled at the time the incoming telephone call is received. BCP 300 then determines the caller (310). BCP 300 can determine the caller using caller ID and/or by referencing the user's contact database in PDA program 140 depicted in FIG. 1.

BCP 300 then goes to the first policy in the policy priority table (312). The first policy is the policy with the highest policy priority number. BCP 300 determines whether the current location, context, and caller meet the policy conditions defined by the location criterion, context criterion, and caller criterion (314). If the current location, context, and caller do not meet the policy conditions, then BCP 300 proceeds to the next policy (316) and returns to step 314. If the current location, context, and caller meet the policy conditions, then BCP 300 adjusts the telephone behavior instructions based on the policy (318). BCP 300 then ends (320).

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for controlling the behavior of a wireless telephone comprising:
    responsive to a plurality of user actions at a telephone, defining a plurality of policies for the telephone;
    detecting an incoming telephone call received by the telephone;
    responsive to detecting the incoming telephone call, performing by the telephone, steps comprising:
        determining a plurality of conditions associated with the telephone;
        comparing the plurality of conditions associated with the telephone to the plurality of policies, each policy comprising:
            a policy priority number;
            a plurality of condition criteria comprising:
                a location criterion;
                a context criterion; and
                a caller criterion; and
            a telephone behavior instruction;
        identifying a single policy within the plurality of policies, the single policy containing the condition criteria corresponding to the plurality of conditions associated with the telephone; and
        adjusting a telephone behavior according to the telephone behavior instruction for the single policy wherein the telephone behavior is an action that the telephone takes in response to the reception of an incoming telephone call; and
    wherein the action comprises a plurality of telephone behaviors;
    wherein ones of the plurality of telephone behaviors comprise: changing the absolute ring volume, changing the relative ring volume, changing the ring tone, playing a message to the caller, sending the call to voicemail, turning off the telephone, vibrating the telephone, or allowing the telephone to ring after a delay;
    wherein the action is accomplished without a mode change control unit, a mode selection button, or a separation of an ambient sound into a speech component and a non-speech component;
wherein the telephone is a wireless telephone;
wherein the policy priority number resolves any outcome conflicts between the policies;
wherein the policies are stared in a policy table according to the policy priority number;
wherein the context criterion is determined by a FDA program stored on the telephone by determining the event or activity in the user's calendar at the specific time that the incoming telephone call is received;
wherein the caller criterion requires determining a caller identity and determining whether the caller matching the caller identity has called within a fixed time interval;
wherein the telephone is operable to determine the location of the telephone by using a GPS network and by using triangulation; and wherein the telephone is operable to determine the caller identity by analyzing the caller ID data associated with the incoming telephone call and by accessing a PDA program stored on the telephone.

2. The method of claim 1 wherein the fixed time interval is the previous two minutes.

* * * * *